United States Patent
Yalla

(10) Patent No.: US 10,122,162 B2
(45) Date of Patent: Nov. 6, 2018

(54) DETECTION OF CAPACITOR BANK FUSE/SWITCH FAILURE

(71) Applicant: Murty Yalla, Palm Harbor, FL (US)

(72) Inventor: Murty Yalla, Palm Harbor, FL (US)

(73) Assignee: Beckwith Electric Co., Inc., Largo, FL (US)

( * ) Notice: Subject to any disclaimer, the term of this patent is extended or adjusted under 35 U.S.C. 154(b) by 724 days.

(21) Appl. No.: 14/584,911

(22) Filed: Dec. 29, 2014

(65) Prior Publication Data

US 2015/0188306 A1  Jul. 2, 2015

Related U.S. Application Data

(60) Provisional application No. 61/921,120, filed on Dec. 27, 2013.

(51) Int. Cl.
  H02H 7/16 (2006.01)
  H02H 3/38 (2006.01)

(52) U.S. Cl.
  CPC .............. H02H 3/382 (2013.01); H02H 7/16 (2013.01)

(58) Field of Classification Search
  USPC .......................................................... 361/15
  See application file for complete search history.

(56) References Cited

U.S. PATENT DOCUMENTS

| | | | | |
|---|---|---|---|---|
| 3,909,672 A * | 9/1975 | Lundquist | ................ | H02H 7/16 324/126 |
| 4,104,687 A * | 8/1978 | Zulaski | .................... | H02H 3/36 361/15 |
| 4,677,364 A * | 6/1987 | Williams | .............. | H02J 3/1864 318/729 |
| 4,769,587 A * | 9/1988 | Pettigrew | .............. | H02J 3/1828 323/209 |
| 5,179,376 A * | 1/1993 | Pomatto | .............. | H02J 13/0086 340/12.32 |
| 5,670,864 A * | 9/1997 | Marx | ........................ | G05F 1/70 323/210 |
| 7,538,684 B2 * | 5/2009 | Schnetker | ............ | G01R 31/343 340/652 |
| 8,575,941 B2 * | 11/2013 | Samineni | ............... | H02H 3/042 324/126 |
| 8,972,209 B2 * | 3/2015 | Gajic | .................... | G01R 31/028 702/58 |
| 2008/0007230 A1 * | 1/2008 | Kalyuzhny | ............... | H02J 3/18 323/205 |
| 2008/0010549 A1 * | 1/2008 | Coolidge | ............. | G01R 31/028 714/44 |
| 2008/0106241 A1 * | 5/2008 | Deaver | ................. | H02J 3/1828 323/209 |
| 2011/0057661 A1 * | 3/2011 | Samineni | ................. | H02H 7/16 324/521 |

(Continued)

*Primary Examiner* — Ronald W Leja

(74) *Attorney, Agent, or Firm* — GrayRobinson, P.A.

(57) ABSTRACT

A method for detecting the operating condition of each phase of a three-phase capacitor bank in a power distribution system, including the steps of, if the RMS neutral current is above the bank status closed setting, comparing the phase angle of neutral current (IN) with respect to voltage on one of the phases (VA, VB or VC) and sending an alarm signal when the comparison of the phase angle of neutral current with respect to the phase voltage differs appreciably from the expected phase angles.

6 Claims, 6 Drawing Sheets

(56) References Cited

U.S. PATENT DOCUMENTS

| | | | |
|---|---|---|---|
| 2012/0194202 A1* | 8/2012 | Xiao | H02H 7/1203 |
| | | | 324/548 |
| 2013/0030598 A1* | 1/2013 | Milosevic | H02J 3/16 |
| | | | 700/298 |
| 2013/0128393 A1* | 5/2013 | Gajic | H02H 7/16 |
| | | | 361/15 |
| 2013/0328569 A1* | 12/2013 | Gajic | G01R 31/42 |
| | | | 324/521 |
| 2014/0062458 A1* | 3/2014 | Gabriel Bergas | G01R 19/2513 |
| | | | 324/87 |
| 2015/0092460 A1* | 4/2015 | Tallam | H02M 7/125 |
| | | | 363/44 |
| 2015/0124358 A1* | 5/2015 | Hulse | H02H 3/325 |
| | | | 361/47 |
| 2015/0188306 A1* | 7/2015 | Yalla | H02H 7/16 |
| | | | 361/15 |

* cited by examiner

| Bank Status | | | | | |
|---|---|---|---|---|---|
| Bank Status ⊙ Disable ⊙ Enable | | | | | |
| 13 — Bank Status Closed | 0.20 | 0.10 | ◀ | ▶ | 100.00 (A) |
| 14 — Bank Status Open | 0.10 | 0.10 | ◀ | ▶ | 100.00 (A) |
| 15 — Neutral Overcurrent Pickup | 110.0 | 80.0 | ◀ | ▶ | 200.0 (%) |
| 16 — Neutral Undercurrent Pickup | 90.0 | 20.0 | ◀ | ▶ | 100.0 (%) |

| OPEN/CLOSE state of each Phase | | | Phase angle of $I_N$ with respect to VA (If VB is used add 120° or for VC add 240° to the angles shown below) |
|---|---|---|---|
| A | B | C | |
| OPEN | OPEN | OPEN | N/A |
| CLOSE | OPEN | OPEN | 90° ± 10° |
| OPEN | CLOSE | OPEN | -30° ± 10° |
| OPEN | OPEN | CLOSE | 210° ± 10° |
| CLOSE | CLOSE | OPEN | 30° ± 10° |
| OPEN | CLOSE | CLOSE | 270° ± 10° |
| CLOSE | OPEN | CLOSE | 150° ± 10° |
| CLOSE | CLOSE | CLOSE | N/A |

DETECTION OF CAPACITOR BANK FUSE/SWITCH FAILURE

CROSS-REFERENCE TO RELATED INVENTIONS

This application claims the benefit of pending provisional application No. 61/921,120, filed Dec. 27, 2013, the disclosure of which is incorporated by reference herein.

BACKGROUND OF THE INVENTION

Field of the Invention

This invention relates to monitoring capacitor banks used to maintain the bus voltage of an electrical power distribution system.

Capacitor banks are an essential part of electrical power distribution systems where they are used to maintain the bus voltage within acceptable limits and keep the power factor close to unity thereby reducing transmission/distribution line losses.

Referring to FIG. 1, capacitor bank fuses 7 are often blown due to faults and transient conditions on power systems such as lightning striking the power lines. When capacitor bank fuses 7 are blown or switches 2 become defective, the capacitor bank 1 will not be operational. It is important to detect this condition and alert the maintenance personnel through wireless communications device 12 incorporated in to the controller so that the blown fuses 7 or the faulty switches 2 can be replaced to bring the capacitor bank 1 to service quickly. If there is no automatic detection and indication mechanism these conditions can only be detected during periodic manual inspection after a long time (several months or years). Having the automatic indication of a capacitor bank fuse or switch failure also reduces or eliminates periodic manual inspection of the capacitor banks.

Neutral current has been used in prior art devices to detect the blown fuse condition for three phase gang operated (all the phases are simultaneously CLOSED or OPENED with a single command) capacitor banks where a neutral current is measured using a current transformer 6 in the neutral to ground connection of the capacitor bank 1. When the neutral current is above a threshold level it can be concluded that either a blown fuse or defective switch is the cause for this neutral current. However, the prior art devices do not identify the phase (A, B or C) of the blown fuse or a defective switch.

When the capacitor bank is required to be opened and closed on a per phase basis individually rather than the gang operation the above described method of comparing the magnitude of the neutral current against a threshold level cannot be used as the neutral current is present any time when one or two out of the three capacitor banks are in CLOSED state.

Therefore, it is an object of this invention to provide an improvement which overcomes the aforementioned inadequacies of the prior art devices and provides an improvement which is a significant contribution to the advancement in the art of power distribution capacitor banks Another object of this invention is to provide an apparatus and method for detecting the operating condition of the individual capacitors (OPEN or CLOSE state of Phase A, B and C) in a capacitor bank.

Another object of this invention is to provide an apparatus and method for measuring a phase voltage (VA or VB or VC) and neutral current and, from such measurements along with the state of the commands sent by the controller to open and close each of the phases, determining which phase includes a defective capacitor fuse or switch.

Another object of this invention is to provide an apparatus and method for measuring 3-phase voltages and neutral current and, from such measurements determine if the capacitor bank is faulty (short circuit of the capacitors or high resistance switch contact)

Another object of this invention is to provide an apparatus and method for measuring 3-phase voltages (VA, VB and VC) and load currents (IA, IB and IC) and detecting a phase overcurrent current due to faults on the distribution feeder.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises monitoring capacitor banks used to maintain the bus voltage of an electrical power distribution system. The apparatus and method of the invention for detection of the operating condition of each phase of a three-phase capacitor bank in a power distribution system, comprising the steps of: measuring one of the phase voltages (VA, VB or VC) and the neutral current in the capacitor bank; comparing the RMS neutral current with all open (bank status open) and all closed (bank status closed) settings to determine if all the three phases of the capacitor bank are open or closed; if the RMS neutral current is above the bank status closed setting, comparing the phase angle of neutral current (IN) with respect to voltage on phase A (VA), or phase B (VB) or phase C (VC); and sending an alarm signal when the comparison of the phase angle of neutral current IN with respect to the voltage VA of phase A differs appreciably from the phase angles indicated in the following chart:

| OPEN/CLOSE state of each Phase | | | Phase angle of $I_N$ with respect to VA (If VB is used add 120° or for VC add 240° to the angles shown below) |
|---|---|---|---|
| A | B | C | |
| OPEN | OPEN | OPEN | N/A |
| CLOSE | OPEN | OPEN | 90° |
| OPEN | CLOSE | OPEN | −30° |
| OPEN | OPEN | CLOSE | 210° |
| CLOSE | CLOSE | OPEN | 30° |
| OPEN | CLOSE | CLOSE | 270° |
| CLOSE | OPEN | CLOSE | 150° |
| CLOSE | CLOSE | CLOSE | N/A |

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 2 setting screen showing bank open close status and neutral over/under current setting screens

FIG. 6 of Table 1 shows the phase angle relationship between VA (or VB or VC) and IN.

Similar reference characters refer to similar parts throughout the several views of the drawings.

DETAILED DESCRIPTION OF THE PREFERRED EMBODIMENT

Figure 1:
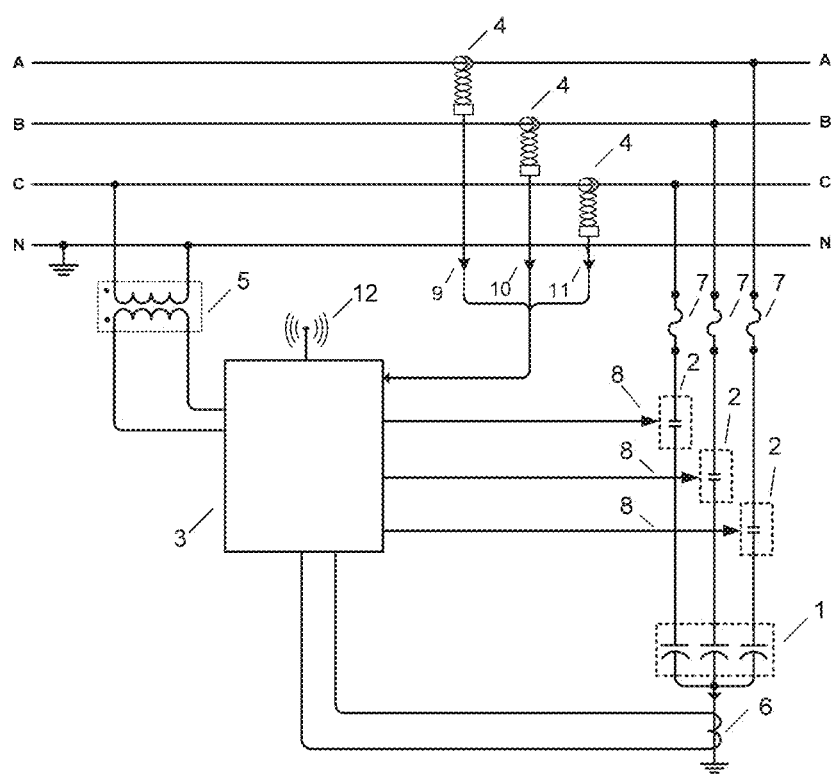
FIG. 1 is a schematic of a 3-phase capacitor bank installation

A new inventive technique is described in this disclosure which will properly detect a fuse or a switch failure and also indicates which phase (A phase, B phase or C phase) the fuse or switch failure occurred. A microprocessor based capacitor bank controller 3 is used in this invention to control the capacitor bank by sending switch OPEN and switch CLOSE commands 8 to the capacitor bank. The controller measures 3-phase voltages (VA, VB and VC) using voltage sensors (or transformers) for controllers that switch based on voltage. For controllers that switch based on reactive power (var) the controller measures 3-phase voltages and load currents 9 (VA, IA), 10 (VB, IB), 11 (VC, IC) using voltage and current sensors (or transformers) 4. The controller also measures neutral current using neutral current sensor (or transformer) 6. Capacitor banks are switched by a variety of control techniques and two prominent techniques are switching based on voltage measurement and the other one is based on reactive power measurement. No matter how the capacitor bank switching is accomplished the inventive technique disclosed here is applicable as long as phase voltage(s) and neutral current measurements are available.

Detection of all Three Phases Open Condition

When the switches of all three phases 2 are OPEN then there will not be any current going through the neutral and the neutral current is expected to be around zero. The "Bank Status Open" neutral RMS current setting 14 should be set to at least twice the noise current level measured when all three phases of the capacitor bank are open. If the measured neutral current magnitude is less than the "Bank Status Open" neutral RMS setting 14 then the controller considers all three phases of the capacitor bank are OPENED.

Detection of all Three Phases Closed Condition

When all switches of the three phases 2 are CLOSED then a small unbalance current is flown through the neutral due to normal voltage unbalance on the three phases or small differences in capacitance values of the three phases. The "Bank Status Closed" neutral RMS current setting 13 should be set at least to twice the maximum RMS neutral current level measured when all three phases of the capacitor bank are CLOSED. If the measured neutral current magnitude is greater than the "Bank Status Open" neutral RMS current setting 14 and less than the "Bank Status Closed" neutral RMS current setting 13 then the capacitor bank is considered as CLOSED.

Detection of One or Two Phases of the Capacitor Bank in Closed Condition

When the measured neutral current is greater than the "Bank Status Closed" setting 13 the inventive technique compares the phase angle relationship between IN with respect to VA (as shown in Table 1, note that VB or VC can also be used as a reference) to determine the status of each phase of the capacitor bank. As an example a tolerance of ±10° is used in Table 1 and it can be adjusted if needed. If the status of the bank obtained based on the real time measurement of phase angle relationship between IN with respect to VA from Table 1 does not match the status of the commands sent by the capacitor bank controller then phase(s) (A, B or C) of the failed fuse(s) 9 (or switch(s)) can be determined and a Neutral Phase Unbalance Alarm 19 can be sent.

As an example if the commands are sent to CLOSE A phase, OPEN B phase and CLOSE C phase switches then the phase angle of IN with respect to VA is expected to be around 150° (see Table 1). However, due to fuse (or switch) failure the measured phase angle of IN with respect to VA is around 90° indicating phase A: CLOSED, phase B: OPENED, phase C: OPENED instead of 150° phase A: CLOSED, phase B: OPENED, phase C: CLOSED condition. From this one can determine that the fuse is blown (or faulty switch) on phase C. This information (failure of phase C fuse (or switch)) can be sent using wireless communications 12 to the maintenance personnel to get immediate attention.

Detection of Internal Faults in a Capacitor Bank and High Resistance Switch Contact In this invention a technique is developed to detect the health of the capacitor bank, internal short circuits and high resistance switch contacts by incorporating neutral overcurrent and undercurrent elements. The neutral current when one or two out of the three phases of the capacitor bank are closed can be determined from the measured voltage on each phase of the capacitor bank and the capacitor bank size ($Q_{CAP}$) as follows:

Expected neutral current ($I_{NE}$)=magnitude of ($I_{A\_cap}$*a+$I_{B\_cap}$*b+$I_{C\_cap}$*c)

Where a=1 if phase A is closed else a=0 b=1 if phase B is closed else b=0 c=1 if phase C is closed else c=0

$$I_{A\_cap}=(1000*Q_{CAP})/(3*V_A)$$

$$I_{B\_Cap}=(1000*Q_{CAP})/(3*V_B)$$

$$I_{C\_cap}=(1000*Q_{CAP})/(3*V_C)$$

Figure 3:
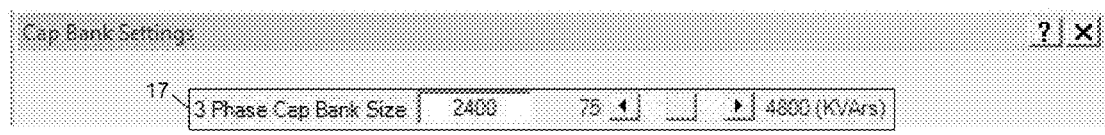
FIG. 3 is a setting screen showing capacitor bank size

$Q_{CAP}$="3 Phase Capacitor Bank Size" in KVArs 17 (see FIG. 3)

$V_A$, $V_B$ and $V_C$ are measured phase to ground voltage phasors and $I_{A\_cap}$, $I_{B\_cap}$ and $I_{C\_cap}$ are the Capacitor Bank current phasors.

Figure 4:
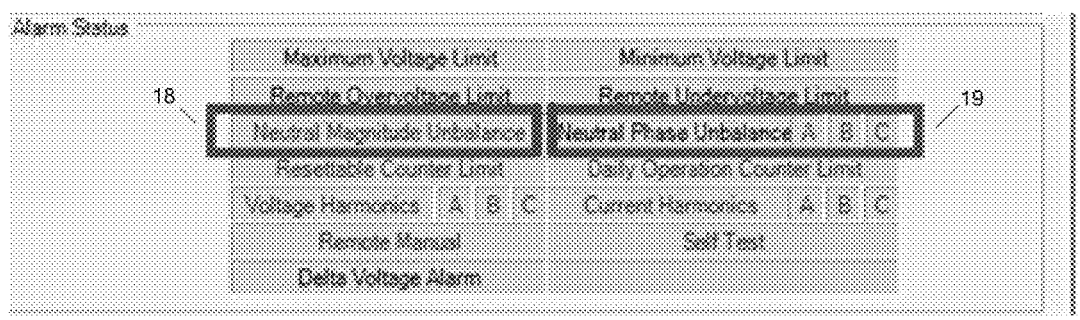
FIG. 4 is an alarm status indication screen showing neutral magnitude unbalance (neutral over current/undercurrent) and phase unbalance (indication of fuse/switch failed phase)

A "Neutral Magnitude Unbalance" alarm 18 (see FIG. 4) is generated if the measured neutral current is greater than the "Neutral Overcurrent Pickup" setting 15 or less than the neutral Undercurrent Pickup setting 16 (see FIG. 2).

A neutral overcurrent or an undercurrent is an indication of the deterioration of the capacitor bank, faults inside the capacitor bank or high resistance switch contacts.

Phase Overcurrent Detection

When the capacitor controller is connected with 3-phase load currents (IA, IB and IC) the control measures three phase load currents providing phase overcurrent detection. Phase overcurrent detection can be used to detect the faulty segment of the distribution feeder. In order to detect a phase overcurrent condition the controller compares the measured load current in each phase with an overcurrent pickup. When the controller detects a phase overcurrent condition it triggers an input to the Sequence of Events recorder and Oscillograph recorder for an Overcurrent Phase A, B, or C event and keeps track of which individual phase caused the event along with the magnitude of current. The current and voltage magnitude along with the phase angle information can be sent to the distribution management system (DMS) using wireless communications. The DMS can calculate the approximate fault location from the Capacitor bank location so that maintenance personnel can be dispatched to the location of the fault. Alternatively, the capacitor controller can be equipped with fault location algorithms by calculating the impedance from the capacitor bank location to the fault and send the location information directly to the maintenance personnel.

The overcurrent detection requires measurement of current over a large dynamic range and the signal will saturate during fault conditions if special provisions are not made to measure these large fault currents. The design includes two different paths for the current signals. One path measures the normal load current accurately and has a dynamic range required for measuring normal load current. These current measurements are used for metering and also used to measure reactive power when the capacitor bank switching based on reactive power is selected. The other path is designed to measure fault currents which has a large dynamic range suitable for overcurrent detection. The control measures current signals in both paths and uses the signals appropriately. The overcurrent detection feature measures the fault currents, voltages and reports these values along with the calculated fault impedance to the distribution management system. This will allow easy identification of faulty segment of the distribution line.

Figure 5:
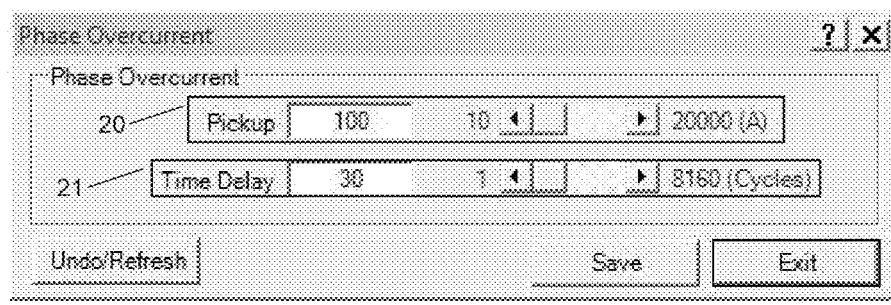
FIG. 5 is a Setting screen for phase overcurrent function.

The settings screen for the phase overcurrent function is shown in FIG. 5.

What is claimed is:

1. A method for detection of the operating condition of each phase of a three-phase capacitor bank in a power distribution system, comprising the steps of:
   measuring one of the phase voltages (VA, VB or VC) and the neutral current in the capacitor bank;
   comparing a RMS neutral current with all open (bank status open) and all closed (bank status closed) settings to determine if all the three phases of the capacitor bank are open or closed;
   if the RMS neutral current is above the bank status closed setting, comparing the phase angle of neutral current (IN) with respect to voltage on phase A (VA), or phase B (VB) or phase C (VC);
   sending an alarm signal when the comparison of the phase angle of neutral current (IN) with respect to the phase voltage (if VA is used add 0°, if VB is used add 120° or for VC add) 240° differs appreciably from the phase angles indicated in the following chart:

| OPEN/CLOSE state of each Phase | | | Phase angle of $I_N$ with respect to VA (If VB is used add 120° or for VC add 240° to |
|---|---|---|---|
| A | B | C | the angles shown below) |
| OPEN | OPEN | OPEN | N/A |
| CLOSE | OPEN | OPEN | 90° |
| OPEN | CLOSE | OPEN | −30° |
| OPEN | OPEN | CLOSE | 210° |
| CLOSE | CLOSE | OPEN | 30° |
| OPEN | CLOSE | CLOSE | 270° |
| CLOSE | OPEN | CLOSE | 150° |
| CLOSE | CLOSE | CLOSE | N/A. |

2. The method as set forth in claim 1, wherein the appreciable difference compared between the phase angle of neutral (IN) with respect to the phase voltage comprises approximately the phase angle indicated in the chart ±10°.

3. A method as set forth in claim 1, wherein measuring one of the three phase voltages in phases (VA), (VB), (VC) and calculating neutral current comprises as follows:

neutral current $(I_{NE})$ =magnitude of
   $(I_{A\_cap}*a + I_{B\_cap}*b + I_{C\_cap}*c)$ Where
   a=1 if phase A is closed else a=0
   b=1 if phase B is closed else b=0
   c=1 if phase C is closed else c=0

$I_{A\_cap} = (1000*Q_{CAP})/(3*V_A)$ $I_{B\_Cap} = (1000*Q_{CAP})/(3*V_B)$ $I_{C\_cap} = (1000*Q_{CAP})/(3*V_C)$ $Q_{CAP}$="3 Phase Capacitor Bank Size" in KVArs
$V_A$, $V_B$ and $V_C$ are phase to ground voltage phasors and $I_{A\ cap}$, $I_{B\ cap}$ and $I_{C\ cap}$ are calculated Capacitor Bank current phasors.

4. The method as in claim 3, further including the step of detecting a high resistance contact of a switch wherein the neutral current is less than an undercurrent pickup setting.

5. The method as in claim 3, further including the step of detecting capacitor bank short circuit wherein the neutral current is greater than a neutral overcurrent setting.

6. An apparatus for detection of the operating condition of each phase of a three-phase capacitor bank in a power distribution system, comprising in combination:
   a voltage meter for measuring one of the phase voltages (VA, VB or VC) and a current meter for measuring the neutral current in the capacitor bank;
   a controller for comparing a RMS neutral current with all open (bank status open) and all closed (bank status closed) settings to determine if all the three phases of the capacitor bank are open or closed and if the RMS neutral current is above the bank status closed setting, then opening or closing each phases when required while comparing the phase angle of neutral current (IN) with respect to voltage on phase A (VA), or phase B (VB) or phase C (VC) and when the comparison of the phase angle of neutral current (IN) with respect to the phase voltage (if VA is used add 0°, if VB is used add 120° or if VC is used add 240°) differs appreciably from the phase angles indicated in the following chart:

| OPEN/CLOSE state of each Phase | | | Phase angle of $I_N$ with respect to VA (If VB is used add 120° or for VC add 240° to the angles shown below) |
| --- | --- | --- | --- |
| A | B | C | |
| OPEN | OPEN | OPEN | N/A |
| CLOSE | OPEN | OPEN | 90° |
| OPEN | CLOSE | OPEN | −30° |
| OPEN | OPEN | CLOSE | 210° |
| CLOSE | CLOSE | OPEN | 30° |
| OPEN | CLOSE | CLOSE | 270° |
| CLOSE | OPEN | CLOSE | 150° |
| CLOSE | CLOSE | CLOSE | N/A. |

\* \* \* \* \*